Patented Nov. 21, 1950

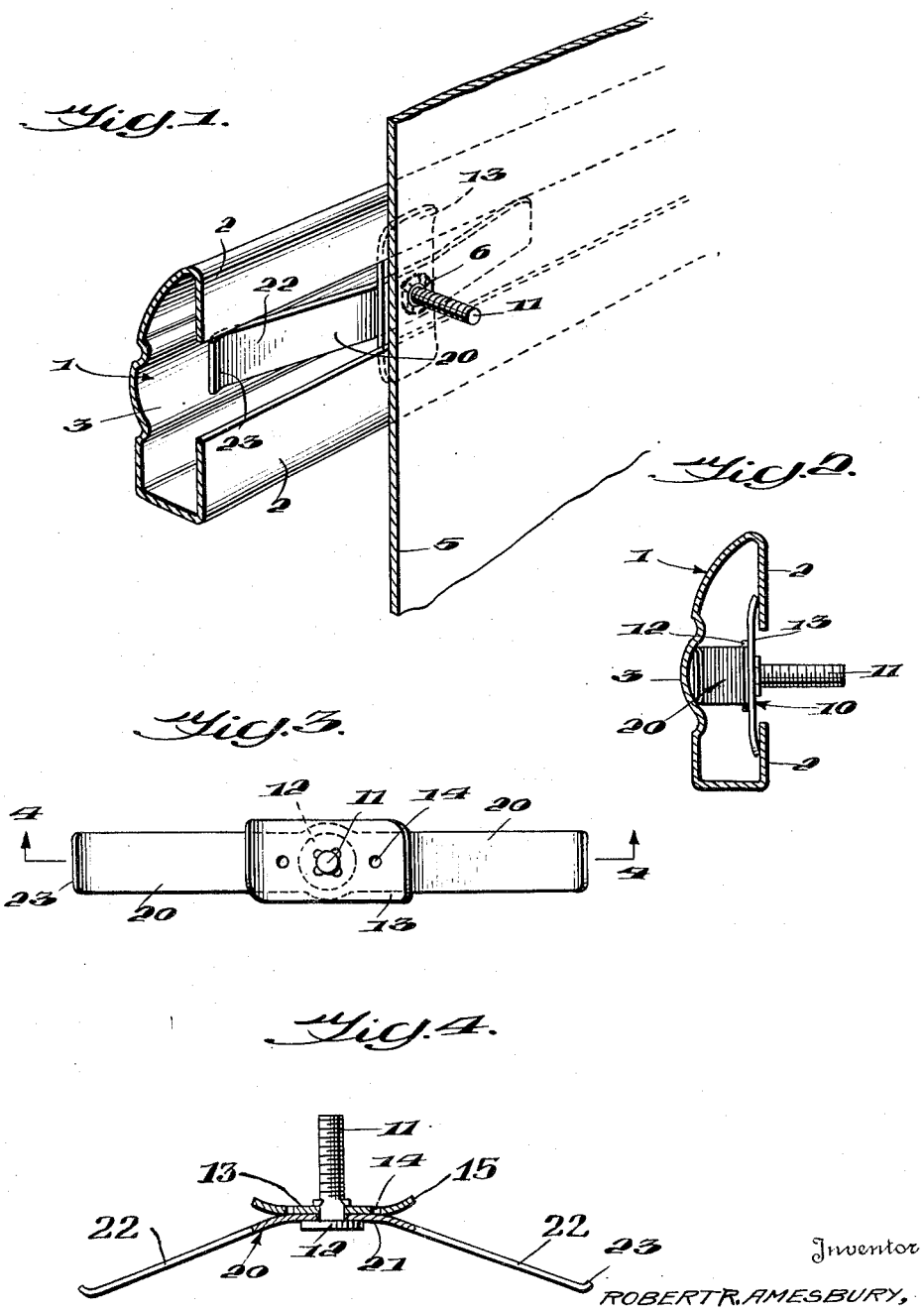

2,531,348

UNITED STATES PATENT OFFICE 2,531,348

TURNABLE T-MEMBER TYPE MOLDING FASTENER

Robert R. Amesbury, Wellesley, Mass., assignor to United-Carr Fastener Corporation, Cambridge, Mass., a corporation of Massachusetts Application August 3, 1946, Serial No. 688,210

4 Claims. (Cl. 24—73)

The present invention relates to fasteners and more particularly to fasteners for attaching moldings, metal trim and the like to motor vehicles, aircraft and other installations, and aims generally to improve existing fasteners for that purpose.

One of the primary objects of the invention is the provision of an improved fastener which may be preassembled within a channel molding for attachment to an apertured support.

A further object of the invention is the provision of a simple and inexpensive fastener particularly adapted for mounting and attaching moldings of irregular shape to an apertured support.

Another object of the invention is the provision of a three-part molding fastener, which, when the parts are adjusted to aligned positions, is readily insertable into a hollow flanged molding strip and movable therein to a desired point, whereupon one part may be turned relatively to the other to resiliently bind the molding strip upon a support.

A further object of the invention is the arrangement of a T-bolt loosely within an apertured resilient thrust plate adapted to be deformed by pressure against a molding when the fastener is inserted therein, the T-bolt being turnable relatively to the thrust plate to bring its cross piece into engagement with spaced portions of the molding to resiliently bind the fastener upon the molding in position for ready insertion through an aperture in an auto fender or the like.

Other aims and advantages of the invention will be apparent to those skilled in the art from an inspection of the accompanying drawings and annexed specification illustrating and describing one preferred embodiment of the invention.

In the drawings—

Fig. 1 is a fragmentary perspective view of a molding strip with my improved fastener positioned therein and with its bolt shank inserted through an aperture in a supporting member on which the molding strip is being secured;

Fig. 2 is a vertical sectional view of a fastener and molding attaching installation, the fastener being illustrated in end elevation;

Fig. 3 is a rear elevation of my improved fastener; and

Fig. 4 is a longitudinal section taken substantially on the line 4—4 of Fig. 3.

Referring to the drawings, the reference numeral 1 designates a molding of suitable shape adapted to be attached to a support 5 provided with an aperture 6 therein. The molding 1 may be of any suitable cross sectional shape, and conveniently is of hollow channeled construction, being provided with spaced-apart inwardly extending flanges 2, spaced laterally from the face 3 of the molding.

The molding 1 is adapted to be secured to the support 5 by means of a fastener member consisting essentially of a T-member and a relatively turnable tensioning member.

As herein illustrated, the T-member comprises a T-bolt 10 which may consist of a threaded shank 11 and an enlarged head 12 at one end and a cross piece 13 swaged or otherwise nonrotatably secured to the shank adjacent the head 12. A tensioning member 20 is secured to the T-bolt 10 and preferably is rotatably mounted on the shank 11 and positioned between the head 12 and the cross piece 13.

Preferably the tensioning member 20 comprises an elongated thrust plate having an apertured hub portion 21 surrounding the shank 11 and opposed extensions 22 which may extend forwardly in an axial direction and outwardly in a radial direction from the shank 11 of the T-member. The terminal ends 23 of the extensions 22 are preferably outwardly curved whereby the thrust plate is adapted for spaced two-point resilient contact with the surfaces of variously curved contours, including straight, inclined or irregularly curved surfaces, when the fastener is advanced into engagement therewith.

In the illustrated embodiment the T-member 10 may be turnable relatively to the thrust plate 20 to bring its cross piece 13 into any desired angular position. To facilitate such turning, spaced apertures 14 may be arranged in the cross piece 13 to receive a spanner wrench or like tool.

In use, the T-member 10 is initially turned to align its cross piece 13 with the wings 22 of the thrust plate 20 substantially as shown in full lines in Fig. 3, and the fastener is then passed between the spaced flanges 2 of the molding desired to be mounted and advanced until the curved tips 23 of wings 22 engage the body portion 3 of the molding. Further pressure upon the fastener will deform the resilient thrust plate, and in positioning the fastener upon the molding such pressure is exerted as needed to advance the cross piece 13 inwardly of the flanges 2, whereupon the T-bolt may be turned to rotate the cross piece into position to engage the forward faces of the flanges 2, substantially as shown in Figs. 1 and 2. The deformed resilient wings of the thrust plate will firmly press the cross piece against the molding flanges and bind the fastener upon the molding prior to the mounting of the molding upon a suitable apertured support indicated generally at 5 in Fig. 1.

The fastener may be slid along a molding strip or elongated molding member until the threaded portion of the bolt is positioned to pass through any desired aperture 6 in the support 5 on which the molding is to be mounted before the cross piece is swung into engagement with the flanges 2. If positioned incorrectly, as during a rough estimate of positions, the fastener may be detached from the molding by pressing forwardly upon the bolt shank until the cross piece is advanced away from flanges 2 and then slid to correct position, whereupon release of the pressure will again bind the fastener upon one molding. Obviously, a plurality of fasteners may be quickly secured at desired spacings along a molding strip prior to mounting the strip upon an auto or the like regardless of whether the strip is straight or curved, uniform or tapering in height or thickness. After the bolt shank 11 has been passed through the desired aperture 6 in the surface 5, a nut is secured thereon and advanced until the flanges 2 of the molding 1 are brought into engagement with the surface 5.

To insure firm engagement of flanges 2 of the molding with such surface, the ends of cross piece 13 are offset rearwardly substantially as shown at 15. When the crosspiece is turned to engage the flanges 2, of the molding, the offset edges 15 thereof will form bearing surfaces or contacts and will press the flanges 2 rearwardly of the swaging abutments raised when the cross piece 13 is secured upon the shank 11 of the T-bolt 10.

Although I have illustrated and described one preferred form of my invention, I do not wish to be limited thereby because the scope of my invention is best defined by the following claims.

I claim:

1. A molding fastener adapted to be preliminarily mounted in a hollow molding provided with spaced inturned flanges, said fastener comprising a bolt having a head, an elongated cross-member mounted on said bolt adjacent said head and having a width less than the space between the inturned flanges of said hollow molding, a resilient thrust member mounted on said bolt between said head and cross-piece, said thrust member having opposed resilient arms thereon extending angularly outward with respect to said cross-member and axially with respect to said bolt, means retaining said cross-member and thrust-member in mounted position on said bolt, at least one of said members being rotatable with respect to said bolt whereby said thrust member and cross-piece may be placed in alignment, inserted into a slot in a molding between spaced inturned flanges thereof with the thrust member in tensioned engagement with the interior of the molding, and the cross-member then turned to engage the inner surfaces of the inturned flanges to secure the fastener to the molding.

2. A molding fastener adapted to be preliminarily mounted in a hollow molding strip provided with spaced inturned flanges, said fastener comprising a bolt having a head and a shank, an elongated cross-piece non-rotatably mounted on said shank adjacent said head and having a width less than the space between the inturned flanges of said hollow molding, a resilient thrust member rotatably mounted on said shank between said head and said cross-piece, said thrust member having opposed resilient arms thereon extending angularly outward with respect to said cross-piece and axially with respect to said bolt, means retaining said cross-piece and thrust member in mounted position on said bolt adjacent the head thereof, said cross-piece and thrust member being movable into alignment whereby they may be inserted into the slot between the inturned flanges of a molding strip with the arms of the thrust member tensioned against the interior of the molding strip, and the cross-piece then turned to engage the inner surfaces of the inturned flanges of the molding strip to secure the fastener to the molding.

3. A molding fastener adapted to be preliminarily mounted in a hollow molding provided with spaced inturned flanges, said fastener comprising an elongated cross-member having a width less than the space between the inturned flanges of a hollow molding with which it is to be assembled and a length greater than this, an attaching member fixedly mounted on said cross-member and extending outwardly therefrom substantially at right angles thereto, said attaching member having a flanged end thereon spaced from said cross-member, a resilient thrust member rotatably mounted on said attaching member between the flanged end thereof and said cross-member, said thrust member having a pair of resilient arms thereon extending angularly outward with respect to said cross-member, and said resilient thrust member being movable into alignment with said cross-member whereby the two of them may be inserted into the slot between the inturned flanges of a molding strip with the arms of the thrust member tensioned against the interior of the molding strip, and the cross-piece then turned to engage the inner surfaces of the inturned flanges of the molding strip to secure the fastener to the molding.

4. A molding fastener adapted to be preliminarily mounted in a hollow molding provided with spaced inturned flanges, said fastener comprising an elongated cross-member having a width less than the space between the inturned flanges of a hollow molding with which it is to be assembled and a length greater than this, a threaded attaching member non-rotatably mounted on said cross-member and extending outwardly therefrom substantially at right angles thereto, said attaching member having an outwardly extending flange thereon spaced from said cross-member, a resilient tensioning member having a base portion provided with an aperture loosely encircling said attaching member between the outwardly extending flange thereon and said cross-member, said tensioning member having resilient arms thereon extending outwardly from said base portion and angularly inclined to said cross-member.

ROBERT R. AMESBURY.

REFERENCES CITED

The following references are of record in the file of this patent:

UNITED STATES PATENTS

| Number | Name | Date |
| --- | --- | --- |
| 1,024,420 | Ross | Apr. 23, 1912 |
| 1,199,357 | Evans | Sept. 26, 1916 |
| 1,370,319 | Kennedy | Mar. 1, 1921 |
| 1,811,262 | De Sana | June 23, 1931 |